Patented June 5, 1945

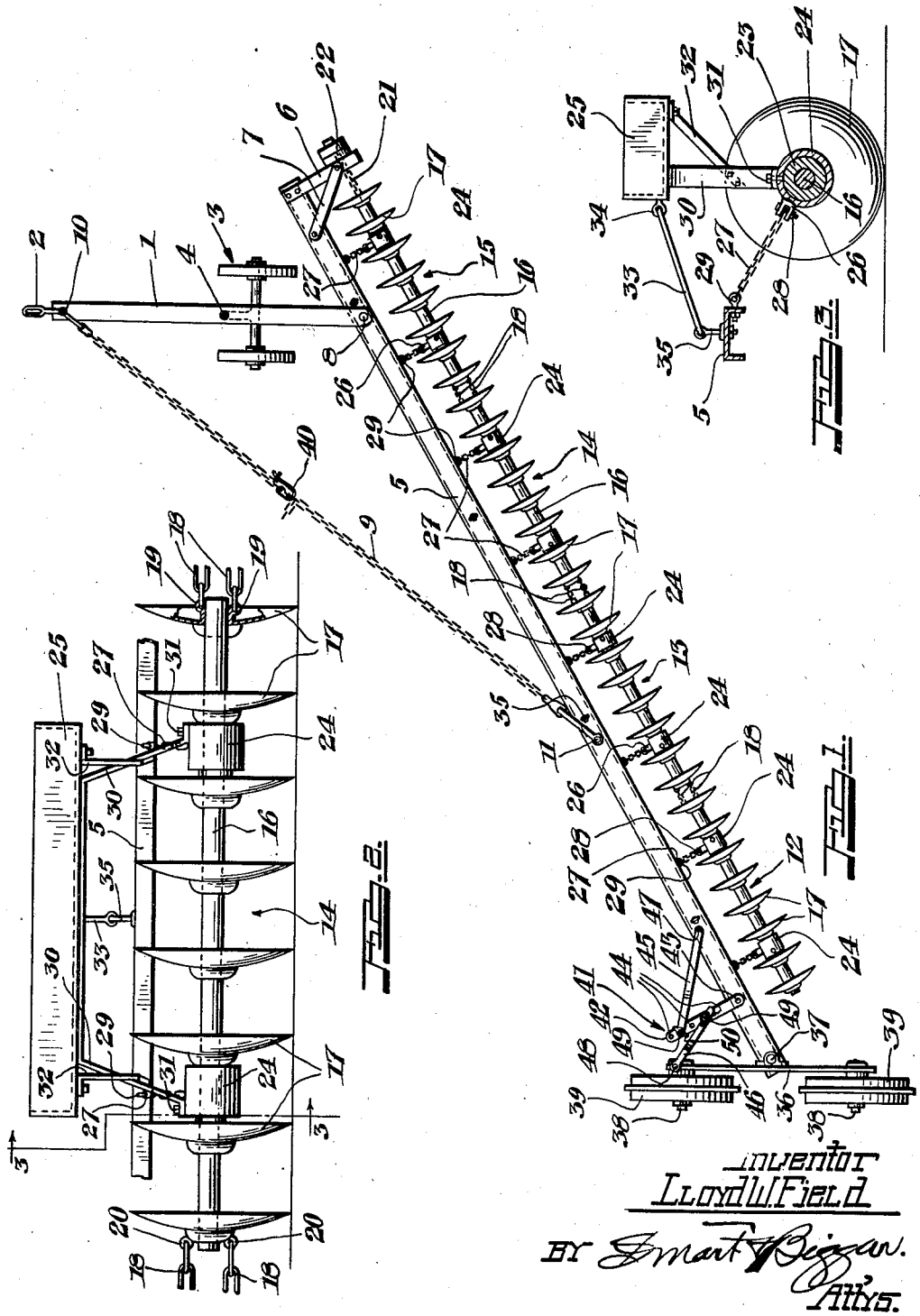

2,377,410

UNITED STATES PATENT OFFICE 2,377,410

DISK HARROW

Lloyd W. Field, Eastend, Saskatchewan, Canada

Application April 24, 1944, Serial No. 532,473

6 Claims. (Cl. 55—73)

This invention relates to a disk harrow for light cultivation such as weeding summer fallow.

The light disk harrow in common use comprises two sections or gangs of disks each connected at substantially the centre of the gang to a yoke which connects the two gangs together and connects each one to the frame of the harrow. It is usual to arrange both sections at an angle to the direction of travel, the two forming a V or inverted V, and the disks on each section are set to face in opposite directions so that the lateral reaction of one gang in one direction is counteracted by the lateral reaction of the other gang in the opposite direction.

In another form of disk harrow known as a one-way disk harrow, the disks, which all face the same way, are secured to a single rigid shaft rigidly mounted in a frame at an angle to the direction of travel. The lateral reaction is borne at the trailing end of the shaft which is thus, in effect, pushed to the side towards which the disks face, that is the leading end of the shaft.

A disadvantage of the usual type of disk harrow is that it forms ridges on the land because the disks on the two gangs face in opposite directions and a disadvantage of both of these machines is that when an obstruction is met by one disk it, in riding up over it, must pull all of the other disks out of the ground. Furthermore both machines and particularly the last described require a strength of construction in the attachment of the gang or gangs to the frame which is expensive.

The object of the present invention is to provide a one-way disk harrow for light cultivation in which a disk gang is flexibly connected directly to the frame and is flexibly connected to a thrust bearing at the leading end of the frame whereby the disk gang is pulled rather than pushed and may tilt to ride over a minor obstruction without pulling the whole of the gang from the ground and without tilting the frame of the harrow.

A further object of the invention is to provide a disk gang connected as described and comprising a plurality of sections flexibly connected to each other whereby any one section may tilt in passing over an obstruction without interfering with the other sections of the harrow.

A draw bar is connected to the frame to one side of centre whereby the frame is drawn substantially parallel to the ground with one end leading and the other trailing, the draw bar is supported by the usual truck pivotally connected thereto, and at least one land wheel is provided to support the trailing end of the frame. Means are provided for adjusting the angle between the draw bar and the frame and in addition separate means for adjusting the angle at which the land wheels are set to the frame whereby on adjustment of the angle between the draw bar and the frame the land wheels may be adjusted to be substantially parallel to the draw bar.

Other objects and features of the invention will be apparent from the accompanying drawing in which, Figure 1 is a top plan of the disk harrow with the weight pans and their supporting struts removed.

Figure 2 is a rear elevation of one disk section showing the mounting of a weight pan and Figure 3 is a section on the line 3—3 of Figure 2.

The draw bar 1 is provided with the usual tractor hitch 2 and truck 3 pivotally mounted at 4. If desired the truck may be provided in known manner with means for adjusting the height of the draw bar.

Frame 5 with its rearward extension 6 and supporting strut 7 at the leading end of the frame, is connected to the draw bar at the pivot 8 and is arranged at an angle to the direction of travel which is adjusted and maintained by chain 9 connected to the draw bar near to the tractor hitch at 10 and to the frame at 11. If desired the chain 9 may be replaced by a telescopic rod or bar having means for fixing it at any desired total length.

The disk gang comprises sections 12, 13, 14 and 15, and each section comprises a shaft 16 and disks 17 secured to the shaft to rotate with it. Section 12 is connected to section 13 by flexible chains 18 secured to eye-bolts 19 at the end of section 12 and eye-bolts 20 at the proximate end of section 13. (See Figure 2.) Similarly section 13 is connected to section 14 and it in turn is connected to section 15 by corresponding flexible chains 18 and eye-bolts 19 and 20. The whole disk gang is connected by a flexible chain 21 to a ball or roller thrust bearing 22 mounted on the rearward extension 6 of frame 5.

Near each end of each shaft 16 is mounted a bearing 23 carrying a sleeve 24 (see Figures 2 and 3) serving as the means of attachment of the disk gang directly to the frame 5, and as the means of support for weight pans 25. Each sleeve 24 is provided with a clevis 26 adapted to receive the end or other link of chain 27. Such link is secured to the clevis by a bolt 28 and the other end of chain 27 is connected to eye-bolt 29 secured to the frame 5 so that the chain 27 is substantially at right angles to the length of the frame 5. This is the flexible connection "direct to the frame."

Each weight pan assembly comprises the pan 25 for carrying weights as may be desired, mounted on struts 30 rigidly secured by bolts 31 to the two sleeves 24 of each disk section. Struts 32 support the rear of the box and each box is provided with a rigid rod 33 connected to eyebolts 34 and 35 secured respectively to the pan 25 and the frame 5, to prevent the weight pan falling forward.

A wheel supporting member 36 is mounted at the trailing end of frame 5 on pivot 37, and carries at each end a wheel spindle 38 and land wheel 39. The disks face toward the leading end of the frame 5, that is towards the thrust bearing 22 and the lateral reaction which is towards the trailing end of the frame is transmitted through the flexible chains 18 and 21, the thrust bearing 22, the frame extension 6 and the frame 5 to the trailing end of the frame and the land wheels 39. These land wheels are, therefore, preferably flanged and weigh approximately 175 pounds each.

The angle at which the disks are set to the direction of travel, and, therefore, the angle between the draw bar and the frame 5 determines the depth of the cut made by the disks, and the angle between the draw bar and the frame 5 is adjusted by lengthening or shortening the chain 9 by means of chain hook 40. It is desirable that the land wheels 39 should be substantially in line with the draw bar, and adjustment of the land wheels is effected by means of the arrangement designated generally by the reference numeral 41. This adjusting arrangement comprises a bar 42 pivotally connected to the frame 5 by bolt 43 and having therethrough a plurality of holes 44, and two adjusting rods 45 and 46 pivotally connected respectively to the frame 5 by bolt 47 and to the wheel supporting member 36 by bolt 48. Each adjusting rod is provided at its free end with a hole of substantially the same size as the holes 44 so that the rods 45 and 46 may be connected to the bar 42 by a bolt 49 and wing nut 50, thereby fixing the wheel supporting member 36 in relation to the frame 5 and preventing it from pivoting on pivot 37. By connecting rod 45 to a hole 44, at or close to the free end of bar 42, and connecting rod 46 to a hole 44 close to the frame 5, the forward land wheel 39 is drawn towards the frame, thereby decreasing the angle between the wheel supporting member 36 and the frame 5. By reversing this procedure the angle is increased. Thus when it is desired that the disks should not cut in so deeply, the chain 9 is shortened by means of the chain hook 40, and rods 45 and 46 are adjusted so that rod 45 is connected closer to the frame 5 and rod 46 is connected farther away from it.

It will be seen that because the gang disk is connected only at the leading end of the frame it is pulled rather than pushed thereby permitting the use of the flexible connection 21. Because of this flexible connection 21 and the chains 27 flexibly connecting the gang disk directly to the frame the gang disk may tilt up and over a minor obstruction without lifting the whole gang disk out of the earth and without tilting the frame of the harrow. Furthermore, because of the flexible connection between the sections, that is the chains 18, any one section may tilt up and over a minor obstruction without interfering with the other sections.

What I claim is:

1. A disk harrow comprising a supporting frame, a draw bar connected to said frame to one side of centre, means connecting the draw bar to the frame at another point on the frame, said means being of such length that the frame is drawn with one end leading and the other trailing in a horizontal plane, a rigid member extending rearwardly from the frame at the leading end, and a disk gang having the disks facing toward the leading end of the frame drawn behind the frame by means flexibly connecting one end of the disk gang to said member so that the lateral reaction of the disks is borne at the leading end of the frame, and by means flexibly connecting the disk gang at points along its length directly to the frame, whereby the disk gang may move up and down independently of the frame.

2. A disk harrow comprising a supporting frame, a draw bar connected to said frame to one side of centre, means connecting the draw bar to the frame at another point on the frame, said means being of such length that the frame is drawn with one end leading and the other trailing in a horizontal plane, a rigid rearwardly projecting extension of the frame at the leading end, and a disk gang comprising a plurality of sections flexibly connected to each other and having the disks facing toward the leading end of the frame, said disk gang being drawn behind the frame by means flexibly connecting one end of the disk gang to the rearward extension of the frame so that the lateral reaction is borne by such rearward extension, and the disk gang being also drawn by means flexibly connecting each section of the disk gang directly to the frame, whereby the disk gang may move up and down independently of the frame.

3. A disk harrow comprising a supporting frame, a draw bar connected to said frame to one side of centre, means connecting the draw bar to the frame at another point on the frame, said means being of such length that the frame is drawn with one end leading and the other trailing in a horizontal plane, a rigid rearwardly projecting extension of the frame at the leading end, a thrust bearing carried by said extension, a disk gang comprising a plurality of sections flexibly connected to each other and having the disks facing toward the thrust bearing, said disk gang being drawn behind the frame by means flexibly connecting one end of the gang to the thrust bearing so that the lateral reaction is borne by the thrust bearing, and the disk gang being also drawn by means flexibly connecting each section of the disk gang directly to the frame, whereby the disk gang may move up and down independently of the frame, the reaction against movement in the direction of travel being borne largely by the flexible connection direct to the frame and partly by the thrust bearing.

4. A disk harrow comprising a supporting frame, a draw bar connected to said frame near to one end thereof, means connecting the draw bar to the frame at a point on the frame between the draw bar and the remote end of the frame, said means being of such length that the frame is drawn with the end near to the draw bar leading and the other trailing in a horizontal plane, a pivotally mounted truck supporting the draw bar and at least one pivotally mounted land wheel supporting the trailing end of the frame, a rigid rearwardly projecting extension of the frame at the leading end, a thrust bearing carried by said extension, a disk gang comprising a plurality of sections flexibly connected to each other and having the disks facing toward the thrust bearing, said disk gang being drawn behind the frame by means flexibly connecting one end of the disk gang to the thrust bearing, so that the lateral reaction of the disks is carried by the thrust bearing, and the disk gang being also drawn by means flexibly connecting each section of the disk gang directly to the frame, whereby the disk gang may move up and down independently of the frame, the reaction against movement in the direction of travel being borne largely by the flexible connection direct to the frame, and partly by the thrust bearing.

5. A disk harrow as defined in claim 4, comprising two land wheels, means for adjusting the length of the said means connecting the draw bar to the frame to vary the angle between the draw bar and the frame, and means for adjusting the angle at which the land wheels are set to the frame whereby, on adjustment of the angle between the draw bar and the frame, the land wheels may be adjusted to be substantially parallel to the draw bar.

6. A disk harrow as defined in claim 2, in which each section is provided near each end with a bearing mounted on the shaft of the section and a sleeve carried by said bearing to rotate on it, and each section is provided with a weight pan supported on struts rigidly connected to the two sleeves of the two bearings of such section, and means connecting the box to the frame to maintain it in an upright position.

LLOYD W. FIELD.